H. F. HECKERT.
HOLDER, ADDING BOARD, AND INDICATOR FOR TAX RATE SHEETS.
APPLICATION FILED MAR. 24, 1910.
967,912.
Patented Aug. 23, 1910.
3 SHEETS—SHEET 2.
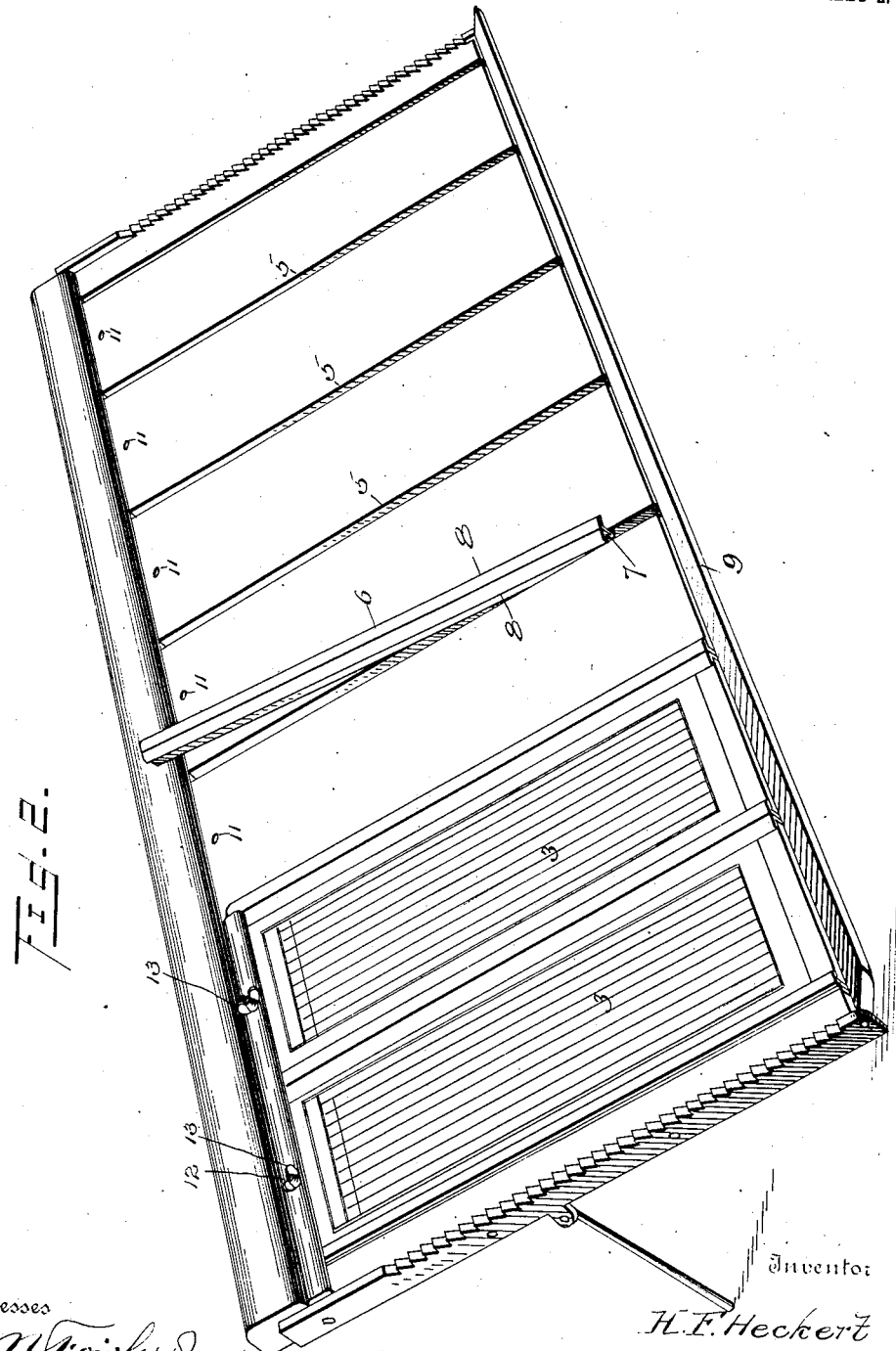

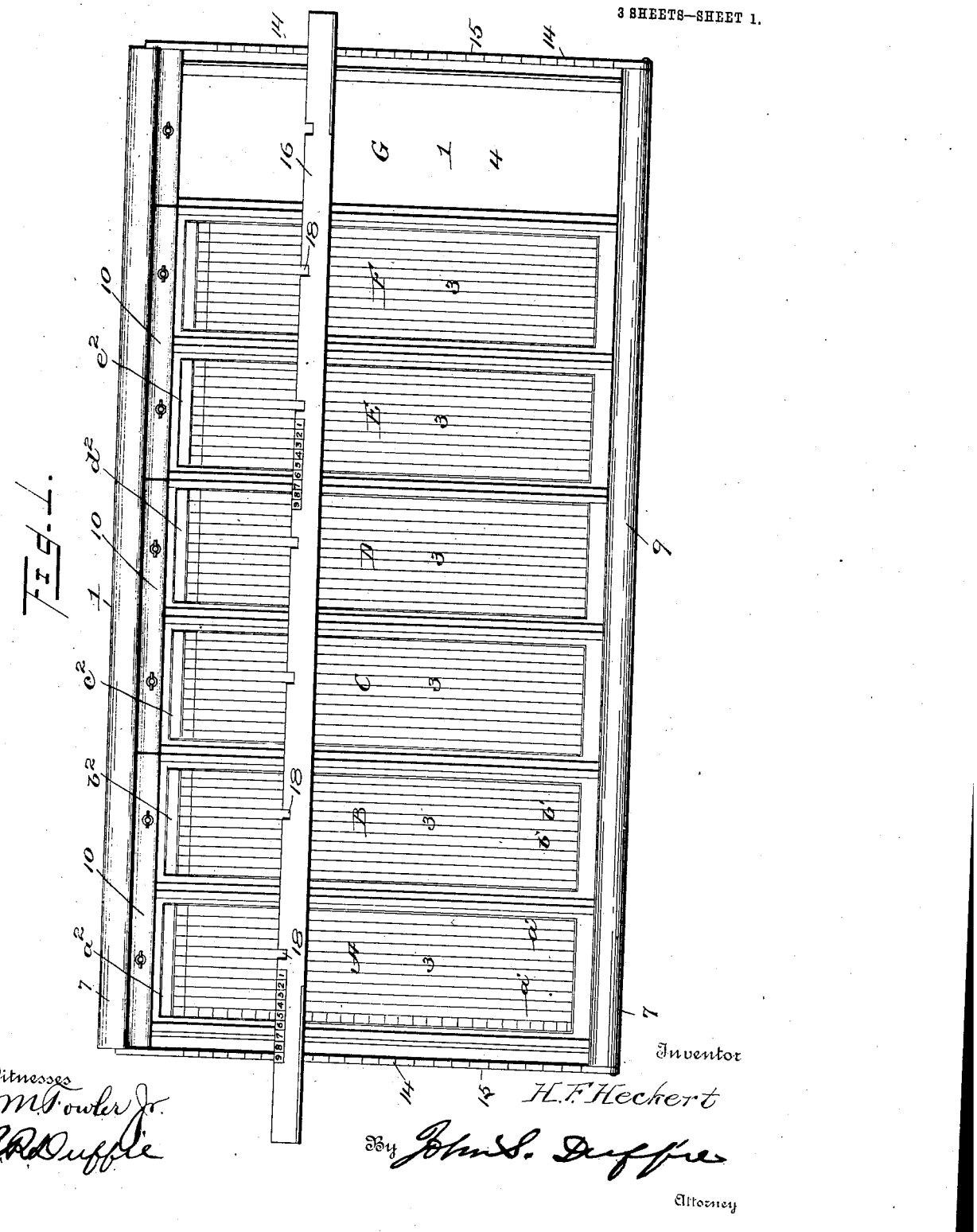

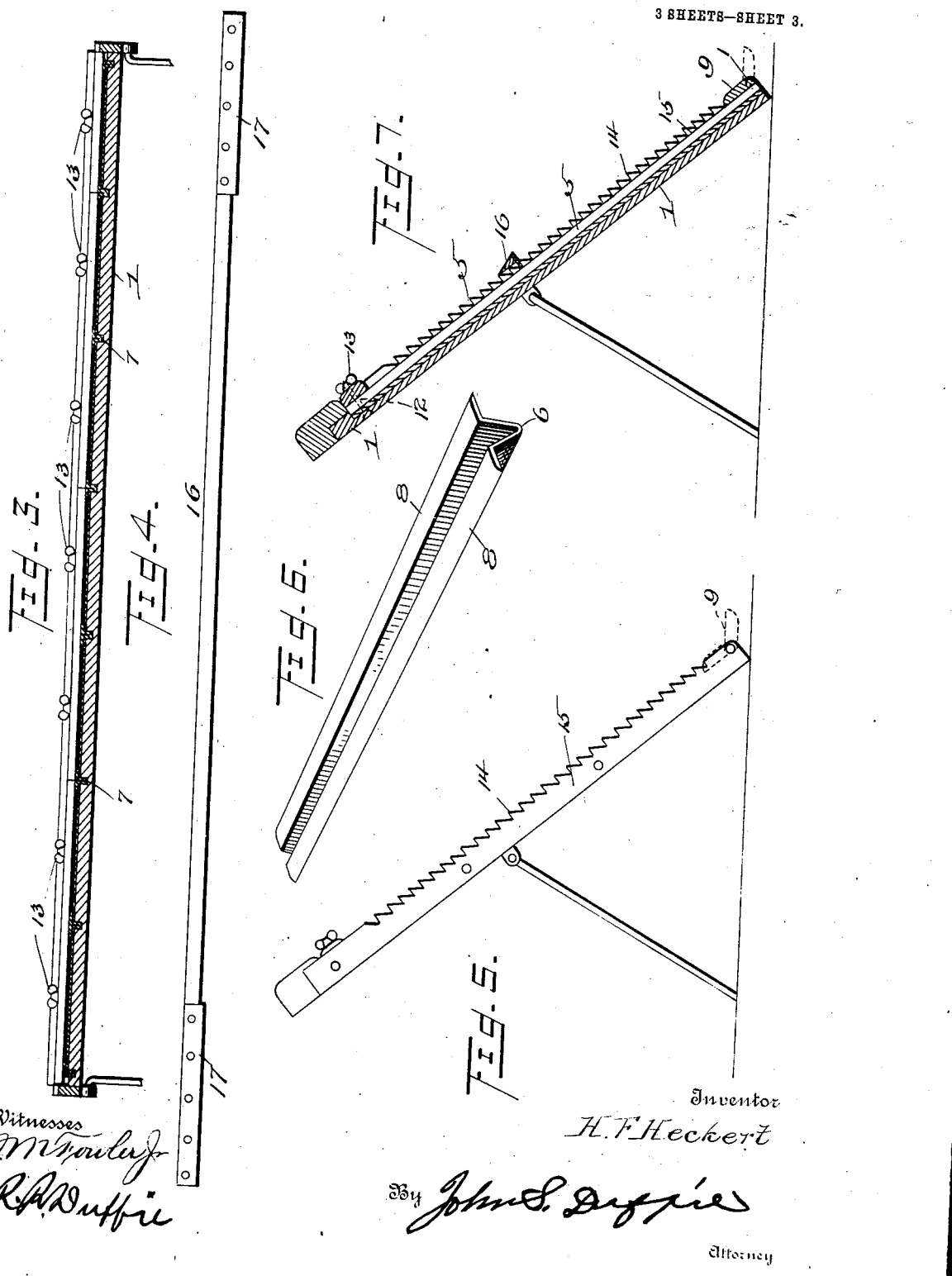

UNITED STATES PATENT OFFICE.

HENRY F. HECKERT, OF NASHVILLE, ILLINOIS.

HOLDER, ADDING-BOARD, AND INDICATOR FOR TAX-RATE SHEETS.

967,912.

Specification of Letters Patent. Patented Aug. 23, 1910.

Application filed March 24, 1910. Serial No. 551,331.

*To all whom it may concern:*

Be it known that I, HENRY F. HECKERT, a citizen of the United States, residing at Nashville, in the county of Washington and State of Illinois, have invented certain new and useful Improvements in Holders, Adding-Boards, and Indicators for Tax-Rate Sheets, of which the following is a specification.

My invention has relation to improvements in holders, adding boards and indicators for "tax rate sheets" and the main object thereof is to produce a device of this kind that will greatly expedite the work of a tax collector's office in figuring out the various taxes to be levied upon real estate in the vicinity, among which taxes may be included such items as State tax, county tax, road tax, school tax, city tax, etc.

By using my device the various taxes can be figured separately and the total thereof found by employing the "total sheet" of my invention. Whereas heretofore one tax could only be figured at a time and the total tax would have to be procured by adding the separate taxes together after obtained or by adding the rates and obtaining the total tax thereby, by the aid of my device each tax may be found separately and the total tax procured at one and the same time, thus reducing materially the time and labor employed in levying the taxes upon each piece of real estate.

With the foregoing and other objects in view my invention consists of the novel construction and arrangement of parts as are described in this specification, illustrated in the accompanying drawing forming a part thereof and particularly pointed out in the claims appended.

Reference being had to the drawings: Figure 1 is a top, plan view of my invention. Fig. 2 is a perspective view of my invention, the indicator being removed. Fig. 3 is a vertical, longitudinal, sectional view thereof. Fig. 4 is a rear, elevational view of the indicator employed. Fig. 5 is an end view of my device. Fig. 6 is a detail. Fig. 7 is a vertical, transverse, sectional view taken on the line 7—7 of Fig. 1.

Referring more particularly to the drawing, in which like numerals designate like parts throughout, my invention is described as follows:

The board 1 is of required length and breadth to conveniently receive a plurality of tax sheets 3, each of which sheets is graduated at a different tax rate. The tax rate sheet which is farthest to the right of the board is graduated to produce the total of all the taxes indicated by all of the other sheets 3. Said board 1 is provided with a plurality of transverse grooves 5, each of which grooves receives a metal T-shaped strip 6, which strips are made of any metal suitable for the purpose. After placing the sheets in proper position the stem or the ridge 7 of each strip 6 is inserted into a corresponding groove 5, the members 8 of each strip over-lapping the edges of corresponding tax sheets. The forward ends of each strip 6 is held in position by means of a longitudinal molding 9, said molding being securely held in that position which is indicated in Fig. 1; the said molding being thrown out of its normal position in Fig. 2, to show the construction thereof and the construction of the parts thereunder. The upper ends of the strips are held in position by means of a plurality of short moldings 10. Passing through each molding and said board 1 is a plurality of perforations 11, each two corresponding perforations receiving a bolt 12 provided with a thumb nut 13, thereby enabling said molding 10 to be removed from the board when desired. Secured to the ends of the board 1 and provided with a plurality of teeth 14 are the metallic bars 15, securely held in position by suitable fastening means.

An indicator 16 is provided with metallic blades 17 on its rear face at each of its ends, a portion of said blades protruding slightly below the lower surface of said indicator. Each of said blades is for the purpose of engaging corresponding teeth in the metallic bars 15. Said indicator is also provided with a plurality of notches 18, each of the notches being equal in thickness to the thickness of one of the columns 19, of the tax sheets 3. It will be observed that at two different places on the upper surface of the indicator there are a number of spaces laid off and numbered from 1 to 9, respectively, which spaces correspond in width to the columns on the tax sheets. It is pointed out that the notches on each bar correspond to and are adjacent with numbers on each of the tax sheets. There are 100 notches in each bar, theoretically speaking, and corresponding numerals from 1 to 100 in the first column of each tax sheet.

For further description and explanation the tax sheets will be referred to in particular as sheet A, B, C, D, E, F or G, as the case may be. Sheet A may be, for instance, the State tax sheet and the rate thereof would be, let us say, 35¢ on each $100 value. If this be the case then sheet A is graduated to indicate the taxes on amounts ranging from $1.00 upward to any amount desired, the latter amount depending upon the number of vertical columns $a'$ on the sheet. Each column represents the graduation of taxes on an additional $100 and, since as many columns as may be desired may be employed, therefore the taxes could be graduated up to any amount required. Should sheet A be as above indicated then there would be printed at the heading $a^2$ of the sheet the following: "State tax. Rate 35¢ per $100." Sheet B is similar to said sheet A in formation but said sheet may be for a different tax and such tax may be at a different rate. There might be printed at the heading $b^2$ the following: "County tax. Rate 50¢ per $100." Likewise sheet C may be for a different tax and at a different rate. There might be printed on the heading $c^2$ of said sheet, "Road tax. Rate 61¢ per $100." Sheet D might contain the school tax and would have printed on its heading $d^2$, "School tax. Rate 84¢ per $100," while sheet E might be for the city tax and would have printed on its heading $e^2$, "City tax. Rate $1.12 per $100." Thus there might be as many sheets as is desired, but the last sheet G, will be graduated for the aggregate of all the taxes and the rate at the heading of the sheet will be the aggregate of all the rates on the preceding sheets.

By using my device the various taxes can be run at the same time and also their sum obtained by using the total sheet G.

I will now give an example of how the taxes on a certain valuation may be obtained: Let us take, for instance, the sum of $650.00 on which taxes are to be extended. To get the indicator 16 in position, place the same in such position that it will be in alinement with "50" in the first column of each tax sheet; then slide the indicator to the right until "6" in the scales marked thereon is opposite the first column of the sheet; the notches 18 in the indicator will then show the amount of taxation on said $650.00 on each sheet, separately, and the aggregate amount of said tax will be indicated on the total sheet G. In this manner the taxes may be found on any sum at different rates and the aggregate tax may be obtained simultaneously, with quickness and accuracy.

Although I have specifically described the construction of my device, yet I may claim the right to make such changes therein as do not depart from the spirit of my invention and as fall within the scope of the appended claims.

Having described my invention, what I claim as new, is:

1. In a device of the kind described the combination of a board, provided with a plurality of transverse grooves, a plurality of tax sheets adapted to be secured to the board, a plurality of metallic T-shaped strips as means for holding the sheets in proper position, the side members of the metallic strips overlapping the edges of adjacent tax sheets, the ridges of the strips received by corresponding grooves in said board, an indicator provided with a plurality of notches which are adapted to be adjusted from the front to the rear of the board, said indicator capable of sidewise movement upon the board, means to secure the strips in position comprising moldings.

2. In a device of the kind described the combination of a base board provided with a plurality of transverse grooves, a plurality of tax sheets each interposed between two adjacent transverse grooves, means to secure said sheets in position consisting of a plurality of T-shaped metallic strips, the ridges of the strips being received by corresponding grooves in the board, each sheet having its edges overlapped by the side members of adjacent strips, means to secure the strips in position consisting of a molding at the front edge of the board and a plurality of moldings at the rear edge thereof, the first-named molding being permanently held in position, the last-named moldings adapted to be removed at will, metallic bars provided with notches secured to each of the ends of the board, an indicator provided with a plurality of notches in its rear face and having secured to the front face at each of the ends metallic blades which protrude slightly below the lower surface of said indicator, said notches being arranged in spaced relation to each other, said blades adapted to engage any of the notches in said metallic bars, thus enabling the indicator to be adjusted from the front to the rear edge of the board, said indicator being further capable of sidewise movement.

In testimony whereof I affix my signature, in presence of two witnesses.

HENRY F. HECKERT.

Witnesses:
JOHN J. HAWKINS,
W. C. O'BRYANT.